UNITED STATES PATENT OFFICE 2,525,515

PROCESS FOR PREPARING AMINOPHENOLS

Frederic R. Bean, Rochester, N. Y., assignor to Eastman Kodak Company, Rochester, N. Y., a corporation of New Jersey No Drawing. Application May 15, 1948, Serial No. 27,360

6 Claims. (Cl. 260—575)

This invention relates to a process for preparing aminophenols and more particularly to a process for preparing aminophenols from aromatic nitro compounds. This application is a continuation-in-part of my copending application Serial No. 547,296, filed July 29, 1944 which issued as U. S. Patent 2,446,519 on August 10, 1948.

It is well known that nitrobenzene can be reduced to yield aniline by means of reducing agents comprising metals, such as iron, zinc and tin, and aqueous solutions of mineral acids, such as hydrochloric acid and sulfuric acid. It is also known that nitrobenzene can be reduced to yield phenylhydroxylamine by means of reducing agents comprising metals, such as aluminium, lead, zinc, and magnesium, and substantially neutral aqueous solutions of salts, such as ammonium chloride, sodium chloride and calcium chloride. Moreover, the phenylhydroxylamine thus produced can be converted to p-aminophenol by heating with aqueous mineral acids, the latter step involving the well known rearrangement of phenylhydroxylamine to p-aminophenol.

It is also known that nitrobenzene can be reduced to yield phenylhydroxylamine by dissolving nitrobenzene in hot concentrated sulfuric acid and treating the hot solution with zinc dust. On the other hand, as stated above, treatment of nitrobenzene with zinc and an aqueous solution of sulfuric acid produces aniline.

In my aforesaid copending application Serial No. 547,296, now U. S. Patent 2,446,519, I have shown that treatment of nitrobenzene with aluminium and an aqueous solution of a mineral acid, e. g. hydrochloric acid, sulfuric acid or phosphoric acid, gives principally not aniline nor phenylhydroxylamine, but rather p-aminophenol. I have also shown that other aromatic nitro compounds can be similarly converted to aminophenolic compounds. In my aforesaid copending application, I have pointed out that among the mineral acids, sulfuric acid is advantageously employed, although hydrochloric and phosphoric acid can be used. I also set forth in the aforesaid copending application organic acids, such as oxalic acid. The present application is directed to the organic acid embodiment.

In accordance with my invention, an aromatic nitro compound containing no substituent in the para position to the nitro group is reduced by reacting simultaneously with aluminium and an aqueous solution of an organic acid, the quantity of said acid present being sufficient to maintain an acid reaction medium until the reduction is finished. The aluminium is advantageously in a divided form, such as flakes or powder. The aqueous solution of the organic acid contains not more than 50 per cent by weight of acid and advantageously contains from 15 to 30 per cent by weight of acid. Oxalic acid is highly useful, as are aliphatic sulfonic acids. Aromatic sulfonic acids are less advantageously employed. Among the aliphatic sulfonic acids which are especially useful in practicing my invention are the alkanesulfonic acids, especially methanesulfonic acid and ethanesulfonic acid. Propanesulfonic acid, butanesulfonic acid, sulfoacetic acid, chloroethanesulfonic acid, bromoethanesulfonic acid and hydroxyethanesulfonic acid are other typical alkane sulfonic acids which can be used. Among the aromatic sulfonic acids, benzenesulfonic acid, p-toluenesulfonic acid, naphthalene-2-sulfonic acid, m-benzene disulfonic acid, 1,3,5-benzene trisulfonic acid, 1,5-naphthalene disulfonic acid, 2,6-naphthalene disulfonic acid, etc. are examples.

The reduction of the aromatic nitro compound with the aluminium and aqueous solution of the organic acid is advantageously effected at a temperature of from 50° to 100° C., although the temperature is apparently not critical. Especially good results have been obtained at temperatures between about 80° and 100° C. In the case of high melting aromatic nitro compounds, a water miscible solvent such as ethyl alcohol, or a water immiscible solvent, such as a hydrocarbon, may be added to the reaction mixture to promote dispersion in the aqueous organic acid.

The following examples will serve to illustrate further the manner of practicing my invention.

*Example 1.—p-Aminophenol*

12.3 g. of nitrobenzene were mixed with 150 grams of water in which 40 grams of oxalic acid were dissolved. The mixture was heated to and maintained at about 95° C., and then 4.5 g. of aluminium flakes were slowly added with vigorous stirring during about one hour. No nitrobenzene remained after 2 further hours' heating and stirring. The reaction mixture was filtered hot and then made alkaline to brilliant yellow with sodium sulfite and sodium carbonate. On cooling and standnig 8 hours, p-aminophenol precipitated. There was some odor of aniline but none separated out. The aluminium did not precipitate from the alkaline solution as it was kept in solution as a complex oxalate compound. The p-aminophenol was filtered off and recrystallized from a small amount of water. It melted at 184° C. Yield 73 per cent.

*Example 2.—4-amino-3-methylphenol*

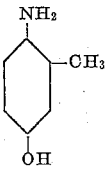

14 g. of o-nitrotoluene were mixed with 300 cc. of water and 60 g. of methane sulfonic acid. This mixture was heated to and maintained at about 95° C. and then 4.5 g. of aluminium were slowly added over a period of about one hour, with vigorous stirring. No o-nitrotoluene remained after two further hours' heating and stirring. The reaction mixture was filtered hot and then made alkaline with sodium sulfite and sodium carbonate. The precipitated salts were filtered off hot and the filter cake washed with hot water. The filtrate was evaporated to about 150 cc. and cooled. 5 g. of 4-amino-3-methylphenol were obtained, melting at 184° to 185° C. with decomposition.

*Example 3.—4-amino-3-methylnaphthol*

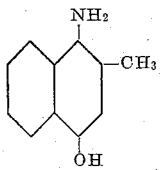

18.7 g. of 2-methyl-1-nitronaphthalene were mixed with 250 cc. of water and 70 g. of ethanesulfonic acid. This mixture was heated to and maintained at about 95° C. and then 4.5 g. of aluminium flakes were slowly added to the mixture over a period of about one hour, with vigorous stirring. Heating and stirring were continued for a further 3½ hours. The reaction mixture was filtered hot. Aqueous sodium hydroxide (40 per cent by weight) was then added to the reaction mixture until the aluminium hydroxide which precipitated was redissolved as sodium aluminate. A small amount of sodium hyposulfite and sodium sulfite were added to the strongly alkaline mixture. An oil separated from the strongly alkaline solution. It was taken up in about 50 cc. of diethyl ether. On evaporation of the ether, the oil remained. It was 1-amino-2-methylnaphthalene and weighed 5 g. It was converted to its hydrochloride.

The strongly alkaline solution, which had been extracted with ether, was made acid with sulfuric acid to Congo red, boiled and filtered to remove colloidal sulfur formed from the decomposition of sodium hyposulfite. On cooling solid material precipitated. The mixture containing the precipitated solid material was extracted with about 100 cc. of diethyl ether. The ether extract was evaporated to dryness giving 0.6 g. of 1,4-dihydroxy-2-methylnaphthalene which after recrystallization from chlorobenzene melted at 172° C. This compound is soluble in caustic alkali and insoluble in aqueous mineral acids. It is a photographic developer. Upon oxidation of 1,4-dihydroxy-2-methylnaphthalene in acetic acid with potassium dichromate and sulfuric acid, the yellow colored 2-methylnaphthoquinone is produced, having marked antihemorrhagic activity and is used in therapy in place of vitamin K for restoring the prothrombin level in man.

The aqueous acid residue from the aforesaid ether extraction was filtered and the solid material collected weighed 8 g. It was dissolved in aqueous sodium hydroxide (10% by weight) to which a small amount of sodium hyposulfite had been added. The resulting solution was boiled with decolorizing charcoal and filtered. The charcoal was filtered off and sodium bisulfite added to the filtrate to precipitate the 4-amino-3-methylnaphthol. This substance is soluble in caustic alkali and in dilute mineral acids. It is a photographic developer. On oxidation with potassium dichromate in dilute sulfuric acid, it gives 2-methylnaphthoquinone, melting at 104° C.

In a similar manner, the following aminophenolic compounds can be prepared:

| Aromatic Nitro Compound | Aminophenol |
| --- | --- |
| m-nitrobenzene sulfonic acid | 5-amino-2-hydroxybenzene sulfonic acid. |
| α-nitronaphthalene | 1,4-aminonaphthol. |
| o-nitrodiphenyl | 2-amino-5-hydroxydiphenyl. |
| m-nitrotoluene | 4-amino-2-methylphenol. |
| m-nitroanisole | 4-amino-2-methoxyphenol. |
| o-nitroanisole | 4-amino-3-methoxyphenol. |
| m-chloronitrobenzene | 4-amino-2-chlorophenol. |
| o-chloronitrobenzene | 4-amino-3-chlorophenol. |
| o-nitroacetophenone | 4-amino-3-acetylphenol. |
| m-nitroaniline | 2,4-diaminophenol. |
| m-nitrophenol | 4-amino-2-hydroxyphenol. |
| o-nitrodiphenyl ether | 4-amino-3-phenoxyphenol. |
| o-nitroethylbenzene | 4-amino-3-ethylphenol. |

Where the nitro aromatic compound itself contains a sulfonic acid group, at least one other of the acids set forth herein which does not contain a nitro group is advantageously employed as the acid in the reduction.

What I claim as my invention and desire to be secured by Letters Patent of the United States is:

1. A process for preparing an aminophenol comprising reducing a nitroaromatic compound selected from the group consisting of nitrobenzene, o-nitrotoluene and 2-methyl-1-nitronaphthalene by reacting the nitroaromatic compound simultaneously with aluminum and an aqueous solution of an acid selected from the group consisting of oxalic acid, methanesulfonic acid and ethanesulfonic acid, at a temperature of from 50° to 100° C., said solution containing from 15 to 30 per cent by weight of the acid, the quantity of acid present being sufficient to maintain an acid reaction medium until after the reduction is finished.

2. A process for preparing p-aminophenol comprising reducing nitrobenzene by reacting the nitrobenzene simultaneously with aluminum and an aqueous solution of oxalic acid, at a temperature of from 80° to 100° C., said solution containing from 15 to 30 per cent by weight of said acid, the quantity of said acid present being sufficient to maintain an acid reaction medium until after the reduction is finished.

3. A process for preparing 4-amino-3-methylphenol comprising reducing o-nitrotoluene by reacting it simultaneously with aluminum and an aqueous solution of oxalic acid, at a temperature of from 50° to 100° C., said solution containing from 15 to 30 per cent by weight of the oxalic acid, the quantity of oxalic acid present being sufficient to maintain an acid reaction medium until after the reduction is finished.

4. A process for preparing 4-amino-3-methylphenol comprising reducing o-nitrotoluene by reacting it simultaneously with aluminum and an aqueous solution of methanesulfonic acid, at a temperature of from 80° to 100° C., said solution containing from 15 to 30 per cent by weight of the acid, the quantity of the acid present being sufficient to maintain an acid reaction medium until after the reduction is finished.

5. A process for preparing p-aminophenol comprising reducing nitrobenzene by reacting it simultaneously with aluminum and an aqueous solution of methanesulfonic acid at a temperature of from 50° to 100° C., said solution containing from 15 to 30 per cent by weight of the acid, the quantity of the acid present being sufficient to maintain an acid reaction medium until after the reduction is finished.

6. A process for preparing 4-amino-3-methylnaphthol comprising reducing 2-methyl-1-nitronaphthalene by reacting it simultaneously with aluminum and an aqueous solution of ethanesulfonic acid at a temperature of from 50° to 100° C., said solution containing from 15 to 30 per cent by weight of the acid, the quantity of the acid present being sufficient to maintain an acid reaction medium until after the reduction is finished.

FREDERIC R. BEAN.

REFERENCES CITED

The following references are of record in the file of this patent:

UNITED STATES PATENTS

| Number | Name | Date |
| --- | --- | --- |
| 2,132,454 | Bassford | Oct. 11, 1938 |
| 2,198,249 | Henke et al. | Apr. 23, 1940 |
| 2,446,519 | Bean | Aug. 10, 1948 |